United States Patent
Cui et al.

(10) Patent No.: US 11,660,731 B2
(45) Date of Patent: May 30, 2023

(54) NEGATIVE PRESSURE DRIVEN SUCKING DISC FOR ANNULAR WEDGE-SHAPED MICROSTRUCTURE AND PREPARATION METHOD OF NEGATIVE PRESSURE DRIVEN SUCKING DISC

(71) Applicant: Beijing University of Technology, Beijing (CN)

(72) Inventors: Jing Cui, Beijing (CN); Huimin Liu, Beijing (CN); Zhongyi Chu, Beijing (CN); Lining Sun, Beijing (CN)

(73) Assignee: Beijing University of Technology, Beijing (CN)

( * ) Notice: Subject to any disclaimer, the term of this patent is extended or adjusted under 35 U.S.C. 154(b) by 0 days.

(21) Appl. No.: 17/454,393

(22) Filed: Nov. 10, 2021

(65) Prior Publication Data
US 2022/0234173 A1 Jul. 28, 2022

(30) Foreign Application Priority Data
Jan. 25, 2021 (CN) .......................... 202110093089.0

(51) Int. Cl.
  *B25B 11/00* (2006.01)
  *B29C 33/38* (2006.01)
  *B29L 31/00* (2006.01)

(52) U.S. Cl.
  CPC ........ *B25B 11/005* (2013.01); *B29C 33/3842* (2013.01); *B29L 2031/756* (2013.01)

(58) Field of Classification Search
  CPC ......... B25B 11/005; F16B 47/00; A47G 1/17; B66C 1/0231
  USPC ....................................................... 269/21, 20
  See application file for complete search history.

(56) References Cited

U.S. PATENT DOCUMENTS

| 1,426,930 A | * | 8/1922 | Waldron | ............... B66C 1/0212 292/DIG. 28 |
| 3,716,307 A | * | 2/1973 | Hansen | ............... B66C 1/0218 248/362 |
| 7,975,971 B2 | * | 7/2011 | Carnevali | ............... F16B 47/00 248/205.8 |
| 2011/0115243 A1 | * | 5/2011 | Desai | ................... B66C 1/0212 294/65 |
| 2014/0225391 A1 | * | 8/2014 | Kuolt | ................... B25J 15/0683 294/183 |

FOREIGN PATENT DOCUMENTS

| CN | 206171598 U | 5/2017 |
| CN | 207503953 U | 6/2018 |
| CN | 108638403 A | 1/2020 |

* cited by examiner

*Primary Examiner* — Leith S Shafi
(74) *Attorney, Agent, or Firm* — Greenberg Traurig, LLP

(57) ABSTRACT

Disclosed are a negative pressure driven sucking apparatus and a preparation method thereof. The sucking apparatus comprises a sucking disc body, wherein a negative pressure cavity is formed in the middle of the sucking disc body, and the negative pressure cavity is connected with a vacuum line, and the bottom of the negative pressure cavity having a flexible section, and an annular wedge-shaped microstructure is formed at the bottom of the body surrounding the flexible section. Stable loading and release processes of the annular wedge-shaped microstructure are realized.

8 Claims, 3 Drawing Sheets

NEGATIVE PRESSURE DRIVEN SUCKING DISC FOR ANNULAR WEDGE-SHAPED MICROSTRUCTURE AND PREPARATION METHOD OF NEGATIVE PRESSURE DRIVEN SUCKING DISC

CROSS REFERENCE TO RELATED APPLICATION(S)

This patent application claims the benefit and priority of Chinese Patent Application No. 202110093089.0, filed on Jan. 25, 2021, the disclosure of which is incorporated by reference herein in its entirety as part of the present application.

TECHNICAL FIELD

The present disclosure relates to the technical field of sucking discs for an annular wedge-shaped microstructure, and specifically relates to a negative pressure driven sucking disc with an annular wedge-shaped microstructure and a preparation method of the negative pressure driven sucking disc.

BACKGROUND ART

Along with continuous development of a precise micro-nano manufacturing technology, impressive advancements have been made in the field of gecko-inspired dry adhesives, researchers successively provide a series of the manufacturing methods for these adhesives, and manufacture a plurality of gecko-inspired dry adhesion with different shapes and properties in a laboratory, and the wedge-shaped microstructure has outstanding controllability due to the fact that the wedge-shaped microstructure is of a special-shaped structure in structure. A load state and a release state can be rapidly switched, and therefore, the dry adhesion is suitable for being applied to the field of grasping operation.

At present, the distribution structure of the wedge-shaped microstructure is mainly divided into a parallel structure array type and an annular structure array type, and a load method of the parallel structure array type wedge-shaped microstructure comprises the following steps: in a tendon mechanisms loading process, shear load is provided by pulling loading tendons to enable the parallel structure array type wedge-shaped microstructure to be stressed and bent, the contact area is increased, and Van der Waals force is generated, so that pickup for a target object is realized, where in the tendon mode is point contact loading, the load degree is difficult to guarantee in actual assembly, they can loosen over time and be difficult to calibrate. Meanwhile, in the load state, the tendon between rigid tile loosen will causes a moment, and hence peeling force will cause the adhesive to detach; in a guide rail sliding block type load process, a sliding block on a guide rail is driven to generate pure tangential displacement to load the wedge-shaped microstructure to be stressed and bent, so that the loading process is achieved, but the flatness of the symmetrically-distributed wedge-shaped microstructure on the same plane is difficult to guarantee, and loading failure of part of the structure is caused.

Therefore, the defects that the driving mode of the parallel structure array type wedge-shaped microstructure is poor in stability, reliable loading is difficult to provide, and adhesion failure is prone to occurring. The defects of an existing parallel structure array type load process are overcome through the fact that adhesive force generated by the annular wedge-shaped microstructure in the loading state has the effect of eliminated peel moment.

Therefore, a negative pressure driven sucking disc with an annular wedge-shaped microstructure and a preparation method of the negative pressure driven sucking disc need to be developed to solve the problems existing in the prior art.

SUMMARY

The present disclosure aims to provide a negative pressure driven sucking disc with an annular wedge-shaped microstructure and a preparation method of the negative pressure driven sucking disc to solve the problems existing in the prior art, realize loading and release processes of the annular wedge-shaped microstructure, provide key technical support for the application of transferring smooth objects, such as wafers, flexible circuit boards and displays.

In order to realize the purpose, the present disclosure provides the following scheme: the negative pressure driven sucking disc with an annular wedge-shaped microstructure provided by the present disclosure comprises a sucking disc body, wherein an axial penetrating negative pressure cavity is formed in the middle of the sucking disc body, and the top of the negative pressure cavity is connected with air tube; and a flexible section is arranged at the bottom of the negative pressure cavity, the annular wedge-shaped microstructure is arranged at the bottom of the sucking disc body, and the flexible section is located in the middle of the annular wedge-shaped microstructure.

Preferably, the sucking disc body is cylindrical, the bottom surface of the sucking disc body is a circular ring surface, and the negative pressure cavity is a cylindrical cavity.

Preferably, the annular wedge-shaped microstructure comprises multiple circles of micro wedge-shaped structures, the multiple circles of micro wedge-shaped structures are distributed in an annular array mode, and each circle of micro wedge-shaped structures is provided with multiple micro wedge-shaped structures.

Preferably, the micro wedge-shaped structure comprises a first inclined plane and a second inclined plane, and the bottom of the first inclined plane is connected with the bottom of the second inclined plane to form a protruding tip; the included angle between the first inclined plane and the vertical plane ranges from 50° to 80°, the included angle between the second inclined plane and the vertical plane ranges from 20° to 60°, and the height of the micro wedge-shaped structure in the vertical direction ranges from 40 to 200 microns.

Preferably, a groove is formed between every two adjacent circles of micro wedge-shaped structures, the adjacent circles of micro wedge-shaped structures are sequentially connected, or a spacing of 30-100 microns between every two adjacent circles of micro wedge-shaped structures.

Preferably, the flexible section is of a hemispherical or arc-shaped arch structure.

Preferably, the sucking disc body and the annular wedge-shaped microstructure are made of silicone rubbers.

Preferably, the sucking disc body is formed through a mold casting process or 3D printing technology; and the annular wedge-shaped microstructure and the bottom of the sucking disc body are bonded into a whole through glue, or the liquid silicone rubbers poured on the mold with an annular micro wedge-shaped structure, and the annular wedge-shaped microstructure and the bottom of the sucking disc body are integrated into a whole.

Also disclosed is a preparation method of the negative pressure driven sucking disc with an annular wedge-shaped microstructure, comprising the following steps:

S1, selecting a mold material;

S2, machining and preparing a mold, and machining annular micro wedge-shaped structures on the surface of the mold;

S3, pouring a liquid silicone rubbers material into the area with the annular micro wedge-shaped structures of the mold, and carrying out vacuum degassing treatment; and S4, removing the sucking disc body from the surface of the mold after the liquid silicone rubber is completely cured at room temperature, namely completing integration of the sucking disc body and the annular wedge-shaped microstructure;

Preferably, in the step S1, the mold is made of wax, resin or metal material; and in the step S2, a tool used for machining is a diamond tool with a micro wedge-shaped tip.

Compared with the prior art, the present disclosure has the following beneficial technical effects:

Firstly, according to the negative pressure driven sucking disc with an annular wedge-shaped microstructure provided by the present disclosure, the bottom surface of the sucking disc body is a plane, when the sucking disc body and the annular wedge-shaped microstructure are integrated into a whole, the flatness of the annular wedge-shaped microstructure is guaranteed, flatness errors caused when traditional parallel structure array type wedge-shaped microstructures are distributed on multiple planes are eliminated, and the contact area between the annular wedge-shaped microstructure and an adhered target object is increased, so that the adhesive force is increased.

Secondly, according to the negative pressure driven sucking disc with an annular wedge-shaped microstructure provided by the present disclosure, the sucking disc body is uniformly shrunk along the center in a negative pressure state, so that the load provided for the annular wedge-shaped microstructure is distributed along the center of the circle, the peel moment existing in the loading process is eliminated, and stable and reliable load can be provided.

Thirdly, according to the negative pressure driven sucking disc with an annular wedge-shaped microstructure provided by the present disclosure, the sucking disc body is of an integral design and can be formed by one-time pouring through a mold, the annular wedge-shaped microstructure and the sucking disc can be integrated into a whole by pouring the liquid silicone rubber on the surface of the mold with the annular micro wedge-shaped structure, and flatness errors caused by middle connection and assembly are reduced.

Fourthly, the whole sucking disc belongs to an elastic body and has a certain automatic align function when being in contact with the adhered target object, so that the sucking disc is in full contact with the adhered target object, and the adhesion stability is improved.

BRIEF DESCRIPTION OF THE DRAWINGS

To more clearly illustrate the embodiment of the present disclosure or the technical scheme in the prior art, the following briefly introduces the attached figures to be used in the embodiment. Apparently, the attached figures in the following description show merely some embodiments of the present disclosure, and those skilled in the art may still derive other drawings from these attached figures without creative efforts.

Figure 1:
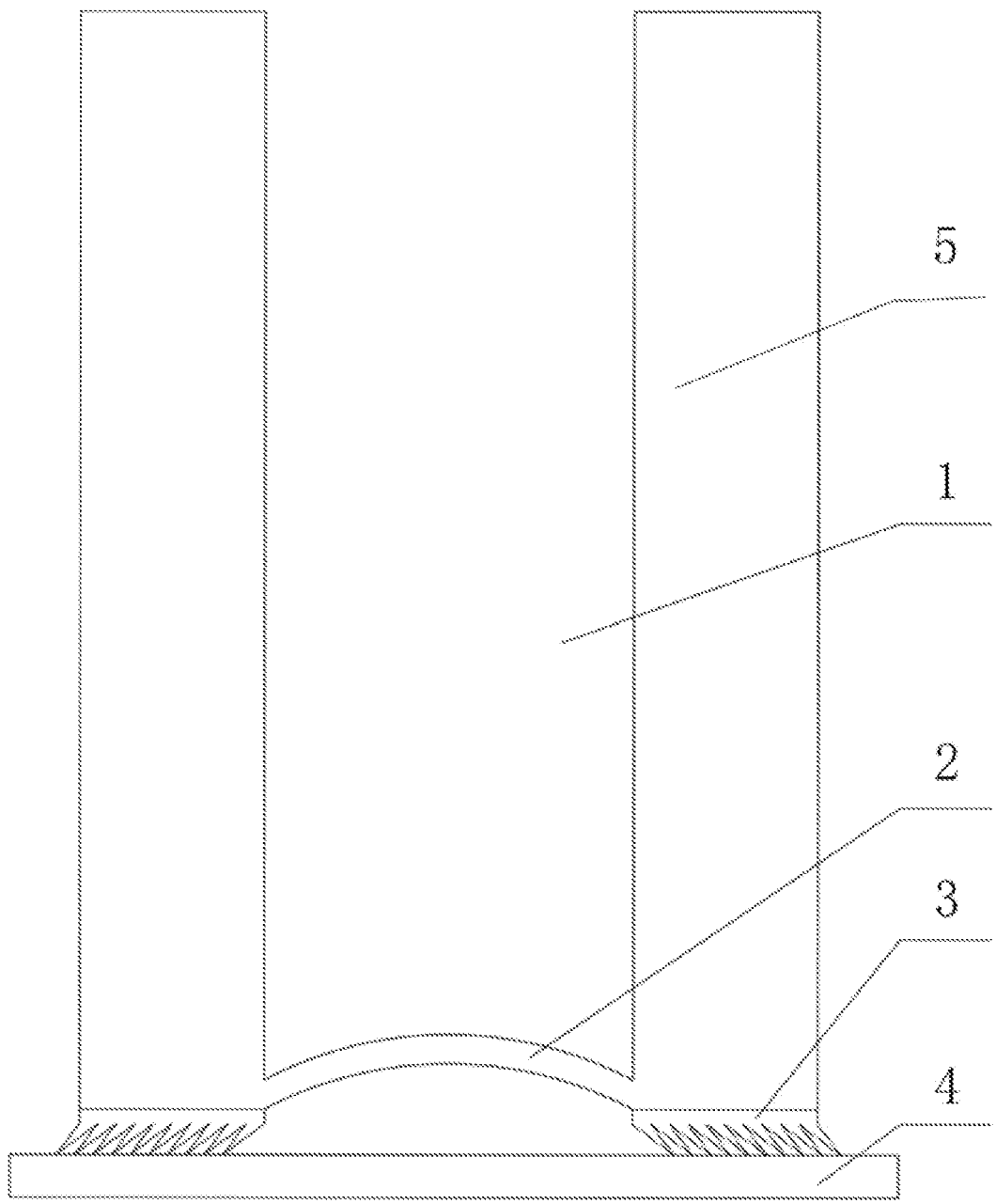
FIG. 1 is a structural schematic diagram of a negative pressure driven sucking disc with an annular wedge-shaped microstructure in the present disclosure.

Reference signs in the drawings: 1, negative pressure cavity; 2, flexible section; 3, annular wedge-shaped microstructure; 4, adhered target object; and 5, sucking disc body.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

To make the foregoing objective, features and advantages of the present disclosure clearer and more comprehensible, the present disclosure is further described in detail below with reference to the attached figures and specific embodiments.

Embodiment I

Figure 2:
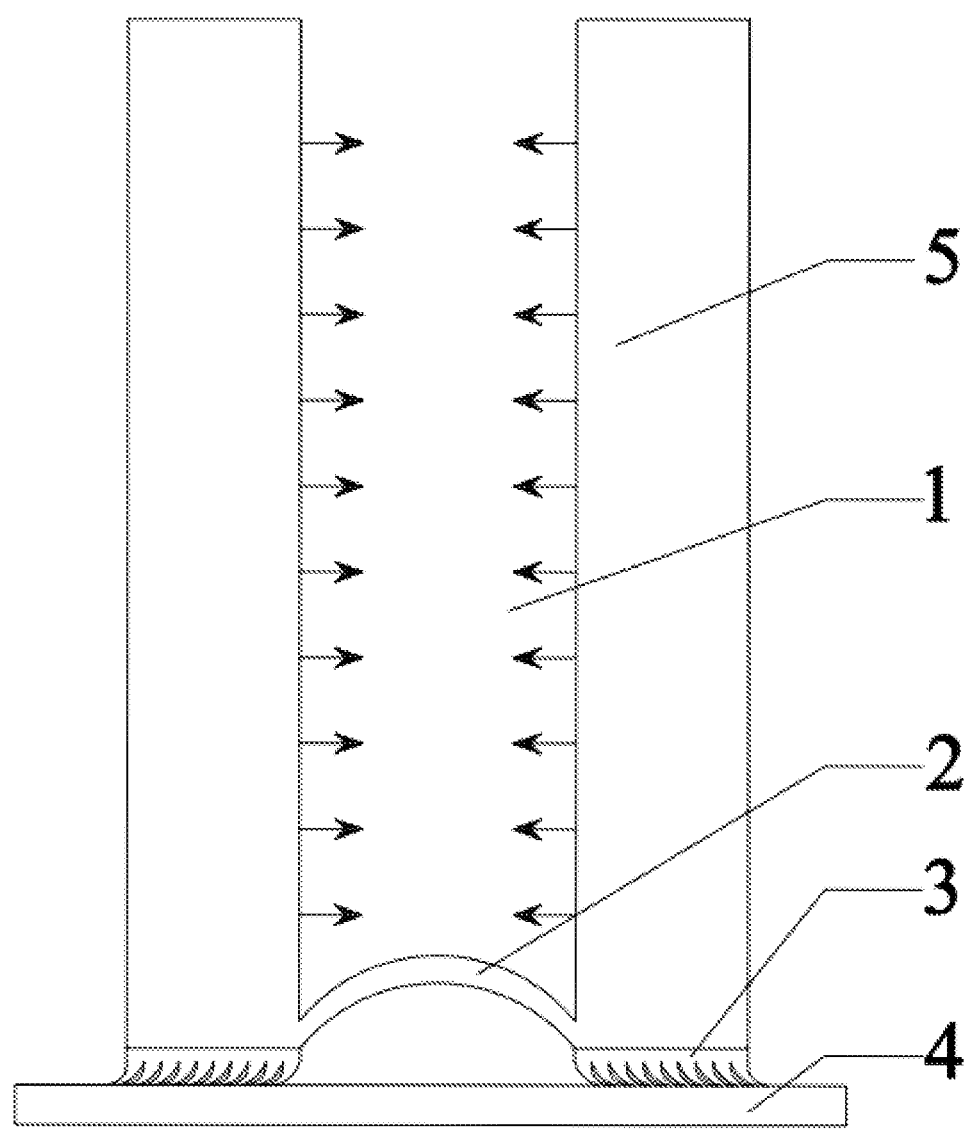
FIG. 2 is a schematic diagram of the negative pressure driven sucking disc with an annular wedge-shaped microstructure in a loading state in the present disclosure.
Figure 3:
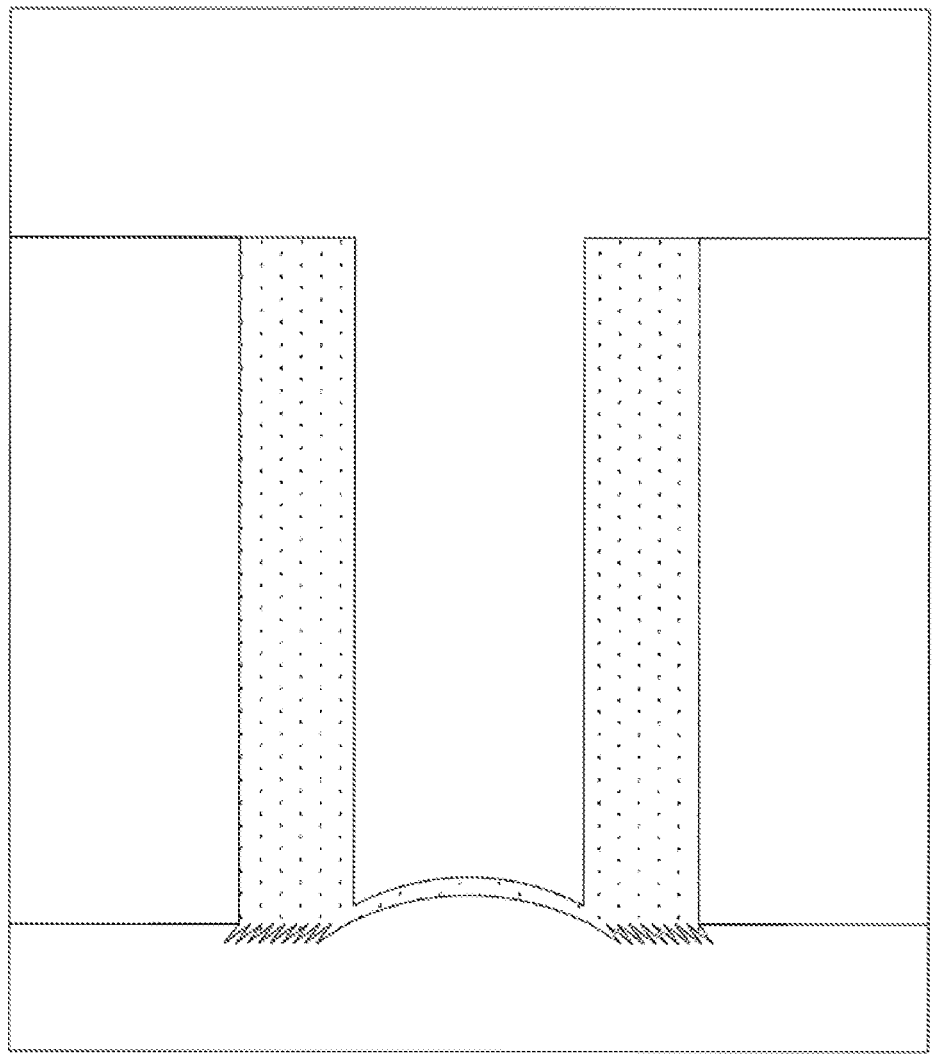
FIG. 3 is an integration process of the sucking disc body and the annular wedge-shaped microstructure into a whole.

As shown in FIG. 1 to FIG. 3, the embodiment provides a negative pressure driven sucking disc with an annular wedge-shaped microstructure, comprising a sucking disc body 5, wherein an axial penetrating negative pressure cavity 1 is formed in the middle of the sucking disc body 5, specifically, the sucking disc body 5 is cylindrical, the bottom surface of the sucking disc body 5 is a flat circular ring surface, and the negative pressure cavity 1 is a cylindrical cavity; the top of the negative pressure cavity 1 is connected with a vacuum gas circuit through a pneumatic connector, and the cylindrical negative pressure cavity 1 can generate uniform shrinkage deformation along the center in a negative pressure state to provide uniform centripetal load for the annular wedge-shaped microstructure 3. A flexible section 2 is arranged at the bottom of the negative pressure cavity 1, the annular wedge-shaped microstructure 3 is arranged on the bottom surface of the sucking disc body 5, and the flexible section 2 is located at the bottom of the negative pressure cavity 1 and in the middle of the annular wedge-shaped microstructure 3 and used for enabling the sucking disc to generate centripetal shrinkage deformation during negative pressure driving; and the flexible section 2 is of a hemispherical or arc-shaped arch structure, so that the side wall of the sucking disc can generate a axis contraction effect under the driving of negative pressure, and stable loading and unloading of the annular wedge-shaped microstructure are realized.

In the embodiment, the annular wedge-shaped microstructure 3 comprises multiple circles of micro wedge-shaped structures, the multiple circles of micro wedge-shaped structures are distributed in an annular array mode, and each circle of micro wedge-shaped structures is provided with multiple micro wedge-shaped structures. Specifically, the micro wedge-shaped structure comprises a first inclined plane and a second inclined plane, and the bottom of the first inclined plane is connected with the bottom of the second inclined plane to form a protruding tip; the included angle between the first inclined plane and the vertical plane ranges from 50° to 80°, the included angle between the second inclined plane and the vertical plane ranges from 20° to 60°, and the height of the single micro wedge-shaped structure in the vertical direction ranges from 40 to 200 microns.

In the embodiment, a groove is formed between every two adjacent circles of micro wedge-shaped structures, the adjacent circles of micro wedge-shaped structures are sequentially connected, the protruding tips and the groove are tightly and alternately arranged in sequence, or a spacing of 30-100 microns between every two adjacent circles of micro wedge-shaped structures.

In the embodiment, the sucking disc body 5 and the annular wedge-shaped microstructure 3 are made of a liquid silicone rubber.

In the embodiment, the sucking disc body 5 is formed through a mold casting process or a 3D printing technology; and the annular wedge-shaped microstructure 3 and the bottom of the sucking disc body 5 are bonded into a whole through glue, or the liquid silicone rubber is poured on the mold with the annular micro wedge-shaped structures, and the annular wedge-shaped microstructure 3 and the bottom of the sucking disc body 5 are integrated into a whole; and the latter is preferably adopted in the embodiment, the annular wedge-shaped microstructure 3 and the bottom of the sucking disc body 5 are integrated into a whole.

Also disclosed is a preparation method of the negative pressure driven sucking disc with an annular wedge-shaped microstructure, comprising the following steps:

S1, selecting a mold material, preferably made of wax, resin or metal material;

S2, machining and preparing a mold with micro wedge-shaped structures, and machining an annular micro wedge-shaped structure array distributed in an annular array on the surface of the mold;

S3, pouring a liquid silicone rubber material into the area with the annular micro wedge-shaped structures of the mold, and after vacuum degassing treatment, covering the surface of the mold with the bottom of the sucking disc body 5; and S4, removing the sucking disc body 5 from the surface of the mold after the liquid silicone rubber is completely cured at room temperature, namely completing integration of the sucking disc body 5 and the annular wedge-shaped microstructure 3;

or bonding the annular wedge-shaped microstructure 3 and the bottom of the sucking disc body 5 into a whole through glue.

In the embodiment, in the step S2, a tool used for machining is a diamond tool with a micro wedge-shaped tip.

In the embodiment, when the negative pressure driven sucking disc with an annular wedge-shaped microstructure works, the working process is divided into a loading process and a release process. The adhesion mechanism of the annular wedge-shaped microstructure 3 is the Van der Waals force effect, when unloaded, the annular wedge-shaped microstructure 3 is slightly inclined, only the tip of the annular wedge-shaped microstructure 3 is in contact with the surface of the adhered target object 4, in this situation, the Van der Waals force can be neglected; and when the side wall of the sucking disc body 5 is driven by negative pressure to shrink and deform to provide load for the annular wedge-shaped microstructure 3, the annular wedge-shaped microstructure 3 is stressed and bent, the contact area is remarkably increased, normal adhesive force is generated at the moment. When the negative pressure in the negative pressure cavity 1 disappears, the sucking disc body 5 recovers an initial non-deformed state, so that the annular wedge-shaped microstructure 3 recovers an initial shape, only the tip of the annular wedge-shaped microstructure 3 is in contact with the adhered target object 4, reducing the contact area and turning the adhesive off. The negative pressure driven sucking disc with an annular wedge-shaped microstructure is of a cylindrical cavity structure and has the function that the side wall of the sucking disc body 5 shrinks through negative pressure to provide centripetal load for the annular wedge-shaped microstructure 3.

As shown in FIG. 1, when the sucking disc body 5 is close to the surface of the adhered target object 4, only the tip of the annular wedge-shaped microstructure 3 is in contact with the surface of the adhered target object 4, no obvious Van der Waals force exists, the sucking disc body is in a natural state, and the adhesive force generated by the annular wedge-shaped microstructure 3 is small and can be neglected.

As shown in FIG. 2, the motion process when the negative pressure driven sucking disc with an annular wedge-shaped microstructure to be loaded is as follows: firstly, the sucking disc body 5 is close to the surface of the adhered target object 4, the annular wedge-shaped microstructure 3 is in contact with the surface of the adhered target object 4, then loading is started, and the side wall of the sucker body 5 is driven by the negative pressure to shrink, so that centripetal load is provided for the annular wedge-shaped microstructure 3 at the bottom of the sucking disc body 5, the annular wedge-shaped microstructure 3 is bent under stress, the contact area is remarkably increased, producing adhesion, and the loading process is achieved. Conversely, when the negative pressure disappears, the side wall of the sucking disc body 5 recovers the initial non-deformed state, centripetal load removed allow the annular wedge-shaped microstructure 3 recovers an initial shape, reducing the contact area and turning the adhesive off, and the release process is achieved.

As shown in FIG. 3, after the liquid silicone rubber and curing are uniformly stirred according to a fixed proportion, vacuum degassing treatment is carried out, the mixture is uniformly poured on the mold with the annular micro wedge-shaped structures, and after the liquid silicone rubber is completely cured, the annular wedge-shaped microstructure 3 is removed from the mold, so that integration of the sucking disc body 5 and the annular wedge-shaped microstructure 3 can be completed.

According to the negative pressure driven sucking disc with an annular wedge-shaped microstructure provided by the present disclosure, stable loading and unloading of the annular wedge-shaped microstructure are achieved through the axis contraction effect of the side wall of the sucking disc body under negative pressure driving, the requirement that traditional suction disc cannot achieve pickup operation of porous objects can be meet, and the sucking disc has wide application prospects in the field of stable carrying operation of smooth plane objects such as ultrathin wafers, ultrathin glass, flexible circuit boards.

For those skilled in the art, obviously the present disclosure is not limited to the details of the exemplary embodiment, and the present disclosure can be achieved in other specific forms without departing from the spirit or essential characteristics of the present disclosure. Therefore, for every point, the embodiments should be regarded as exemplary embodiments and are unrestrictive, the scope of the present disclosure is restricted by the claims appended hereto, therefore, all changes, including the meanings and scopes of equivalent elements, of the claims are aimed to be included in the present disclosure, and any mark of attached figures in the claims should not be regarded as limitation to the involved claims.

Several examples are used for illustration of the principles and implementation methods of the present disclosure. The description of the embodiments is used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. A negative pressure driven sucking apparatus, comprising:
   a sucking disc body including a cavity being connected with a vacuum line for generating a negative pressure in the cavity, a floor of the cavity forming a part of a bottom of the sucking disc body, the floor of the cavity having a flexible section and the floor having a sealing and fixed connection with an inner wall of the sucking disc body while the negative pressure is generated in the cavity; and
   an annular wedge-shaped microstructure formed on the bottom of the sucking disc body surrounding the flexible section.

2. The negative pressure driven sucking apparatus according to claim 1, wherein the sucking disc body is cylindrical, the bottom has a circular ring surface, and the cavity is a cylindrical cavity.

3. The negative pressure driven sucking apparatus according to claim 1, wherein the annular wedge-shaped microstructure comprises multiple circles of micro wedge-shaped structures, the multiple circles of micro wedge-shaped structures are distributed in an annular array mode, and each circle of micro wedge-shaped structures is provided with multiple micro wedge-shaped structures.

4. The negative pressure driven sucking apparatus according to claim 3, wherein the micro wedge-shaped structure comprises a first inclined plane and a second inclined plane, and the bottom of the first inclined plane is connected with the bottom of the second inclined plane to form a protruding tip; the included angle between the first inclined plane and the vertical plane ranges from 50° to 80°, the included angle between the second inclined plane and the vertical plane ranges from 20° to 60°, and the height of the single micro wedge-shaped structure in the vertical direction ranges from 40 to 200 microns.

5. The negative pressure driven sucking apparatus according to claim 4, wherein a groove is formed between every two adjacent circles of micro wedge-shaped structures, the adjacent circles of micro wedge-shaped structures are sequentially connected, or a spacing of 30-100 microns between every two adjacent circles of micro wedge-shaped structures.

6. The negative pressure driven sucking apparatus according to claim 1, wherein the flexible section is of a hemispherical or arc-shaped arch structure.

7. The negative pressure driven sucking apparatus according to claim 1, wherein the sucking disc body and the annular wedge-shaped microstructure are made of a liquid silicone rubber.

8. The negative pressure driven sucking apparatus according to claim 7, wherein the sucking disc body is formed through a mold casting process or a 3D printing process; and
   the annular wedge-shaped microstructure and the bottom of the sucking disc body are bonded by a glue, or the liquid silicone rubber is poured on the mold with the annular micro wedge-shaped structures, and the annular wedge-shaped microstructure and the bottom of the sucking disc body are integrated into a whole.

* * * * *